350-3.81 SR
XR 2,982,176

May 2, 1961 R. H. KAY 2,982,176

INFORMATION STORAGE AND RETRIEVAL SYSTEM

Filed Nov. 28, 1958 3 Sheets-Sheet 1

INVENTOR.
RONALD H. KAY
BY Walter L. Madden Jr.
ATTORNEY

May 2, 1961 R. H. KAY 2,982,176

INFORMATION STORAGE AND RETRIEVAL SYSTEM

Filed Nov. 28, 1958 3 Sheets-Sheet 3

United States Patent Office 2,982,176
Patented May 2, 1961

2,982,176

INFORMATION STORAGE AND RETRIEVAL SYSTEM

Ronald H. Kay, Palo Alto, Calif., assignor to International Business Machines Corporation, New York, N.Y., a corporation of New York Filed Nov. 28, 1958, Ser. No. 777,114

1 Claim. (Cl. 88—24)

This invention relates in general to information storage systems and relates more particularly to systems for the optical storage and retrieval of information recorded on objects such as documents.

The storage of large numbers of documents in a readily accessible form is a problem in which there is considerable interest, particularly in view of the increasing number of documents, such as letters, technical literature, etc., which are accumulating and whose usefulness depends to a large extent on their ready accessibility. One of the systems proposed for the storage of large numbers of such documents involves the reduction of the documents to a fraction of their original size and the storage of these reduced images on film strips in a storage bin from which they may be retrieved for read-out of some sort. Both the recording (posting) of the document image and the reading out of the document image involve optical systems employing lenses for producing the desired image transfer. To effect image transfer it is necessary that the film strip be positioned a fixed distance from the image producing lens. This is achieved by either bringing the strip to the image forming lens or by bringing the image forming lens and its associated illumination system to the strip. Since the number of separate document images which it is desired to store in a single storage and retrieval system is quite large, it follows that a considerable movement of the film strip or the optical system may be required to position a given film strip with respect to the optical station, thus increasing the complexity of the system and increasing the time required to gain access to any bit of information in the file.

Broadly, the present invention contemplates an information storage and retrieval system which reduces or eliminates the need for lenses and which obviates the movement of the strip with respect to the optical system. The present invention contemplates the storage of the images in the form of holograms in a file system. A hologram is the optical pattern or image of an object which has both opaque and transparent regions and which is illuminated by a monochromatic point light source. Such a hologram has no direct resemblance to the object, but it is the product of a series of overlapping diffraction patterns, each pattern due to a point of the object. A hologram may be produced without the aid of lenses and may be permanently recorded on a light sensitive medium, such as photographic film.

This hologram, now a transparency on film, may in turn be viewed when illuminated by a monochromatic point source. The viewed image will constitute a reconstruction of the original object and can be recorded photographically at the appropriate position with respect to the hologram and the point source. In this process, the hologram, which contains all the information about the object, is also capable of performing the image reproducing function usually associated with a lens. Thus, in the present invention, a hologram of a document image or other partially transparent object to be stored is produced on a suitable light sensitive medium, such as photographic film. The distance along the optical axis between the hologram and the object and the point light source may vary over a considerable range. Thus, a plurality of holograms of different objects may be produced and stored at spaced points along the optical axis. These holograms constitute the stored information which may be retrieved from the file and positioned at the same points on the optical axis at which the holograms were produced and illuminated by a monochromatic point light source to reproduce a facsimile of the originally stored information on a suitable light sensitive output medium.

Objects and advantagse of the present invention will be readily apparent from the following description when read in connection with the accompanying drawings, in which:

Fig. 1 is a perspective view schematically illustrating an information storage and retrieval system in accordance with the present invention utilizing a single lens in reconstructing the image from the hologram;

Figs. 2*a* and 2*b* diagrammatically illustrate the theory of the use of reconstructed wavefronts to produce holograms;

Fig. 3 diagrammatically illustrates the application of the theory of hologram formation to the problem of information storage;

Figure 2A:
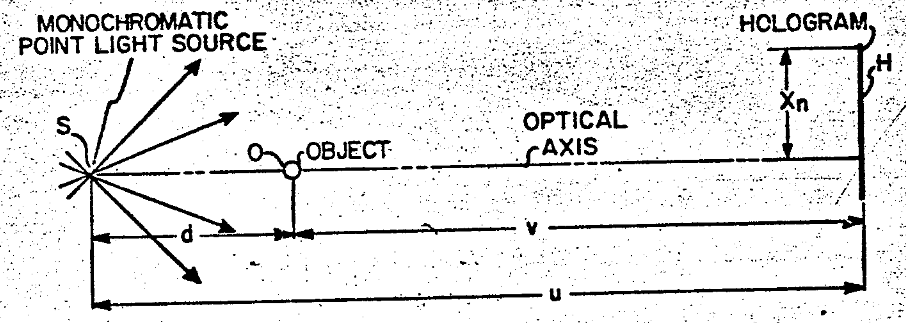

Fig. 2*a* illustrates the theory of the use of reconstructed wavefronts for producing holograms. As shown in Fig. 2*a*, a monochromatic point light source S illuminates an object O which is spaced a distance $d$ from the source S. The diffraction pattern resulting from this illumination falls upon a sheet of light sensitive material H, such as a film strip, to form thereon a hologram of the object O. If this hologram is in turn illuminated by a point light source S, (Fig. 2*b*) there will be formed two images, O′ and O″, of the original object. These two images may be both virtual or one of them, namely, the conjugate image O′, may be real depending upon the geometrical arrangement employed in making and reconstructing the hologram. The hologram thus acts simultaneously as a positive and a negative lens with a built-in object. The focal length $f$ of this equivalent lens is related to the distance $u$ and $v$ of the hologram from the light source and the object, respectively, by the relation, $$\frac{1}{v}-\frac{1}{u}=\frac{1}{f} \qquad (1)$$

$$f=\frac{X_n^2}{n\lambda} \qquad (2)$$

where $n$ is a constant depending upon the distance $X_n$ measured along the hologram and $\lambda$ is the wavelength of the illumination used in making the hologram. From Equation 1 and the distance $u'$ of the hologram from the source during the process of reconstruction, the distances $v'$, $v''$ of the two reconstructed images O′, O″, from the hologram can be calculated from the following equations:

$$\frac{1}{v'}-\frac{1}{u'}=\frac{1}{f} \qquad (3)$$

$$\frac{1}{v''}-\frac{1}{u}=\frac{1}{f} \quad (4)$$

The depth of field of this method of image formation is infinite. In other words, a hologram contains all the information of a thick object. Since there is a specific relationship between any plane in the object and its reconstruction, it appears that any plane can be reconstructed at will. The interference from other planes will be serious only when the depth of focus of the hologram is large compared to the separation between these reconstructed planes.

Figure 2B:
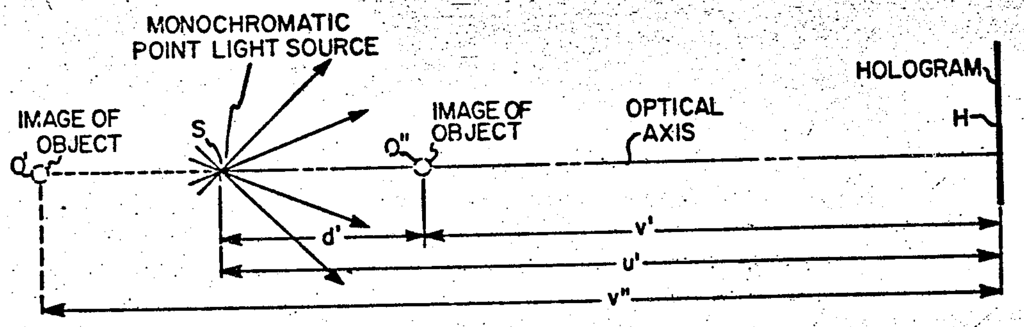

The magnification of the reconstructed image is the product of the geometrical and the physical magnification. The geometrical magnification is determined from the distances $u$, $v$, $u'$ and $v'$, while the physical magnification is determined from the wavelengths of the radiations $\lambda$ and $\lambda'$ used for making and reconstructing the hologram. Equation 2 shows that if $f$ is to be constant, and $\lambda$ increases to $\lambda'$, then $X_n$ should be increased to $X'_n$, resulting in increasing the geometrical magnification by the factor $\sqrt{\lambda'\lambda}$. On the other hand, if $X_n$ is left constant, then an increase in $\lambda$ will result in a decrease in $f$ and hence the final magnification will be the geometrical one only. The total magnification $m$ can be calculated from the formula:

$$m=\left(\frac{u}{u^1}\frac{d}{d^1}\right)\left(\frac{f^1\lambda^1}{f\lambda}\right) \quad (5)$$

where the symbols have the same meaning as in Figs. 2*a* and 2*b*.

Figure 3:
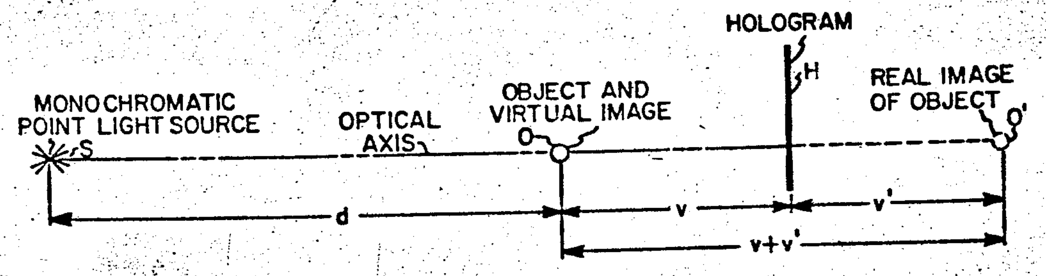

Fig. 3 diagrammatically illustrates the application of the theory of hologram formation to the problem of document storage. A monochromatic point source S illuminates a partially transparent object O which may represent a document to be stored in the system. This illumination of the object will form a hologram H, from which two images, O and O' can be reconstructed. The document thus can be stored in the form of hologram H, while it can be read out in either the plane O or the plane O'. O being the virtual image while O' is the real image. Utilizing the same wavelength of radiation and the same geometrical arrangement for reconstructing the image as for producing the hologram, the image O will have unity magnification while the image O' will have a magnification higher than unity. It is necessary in the document storage system under consideration that the holograms of different objects be stored in different planes, while the final readable images should be in the same plane. In other words, it is required that $v$ is variable for different objects while $(v+v')$ is constant. To accomplish the above requires that the virtual image O be utilized and the real image O' be eliminated, or vice versa.

Figure 1:
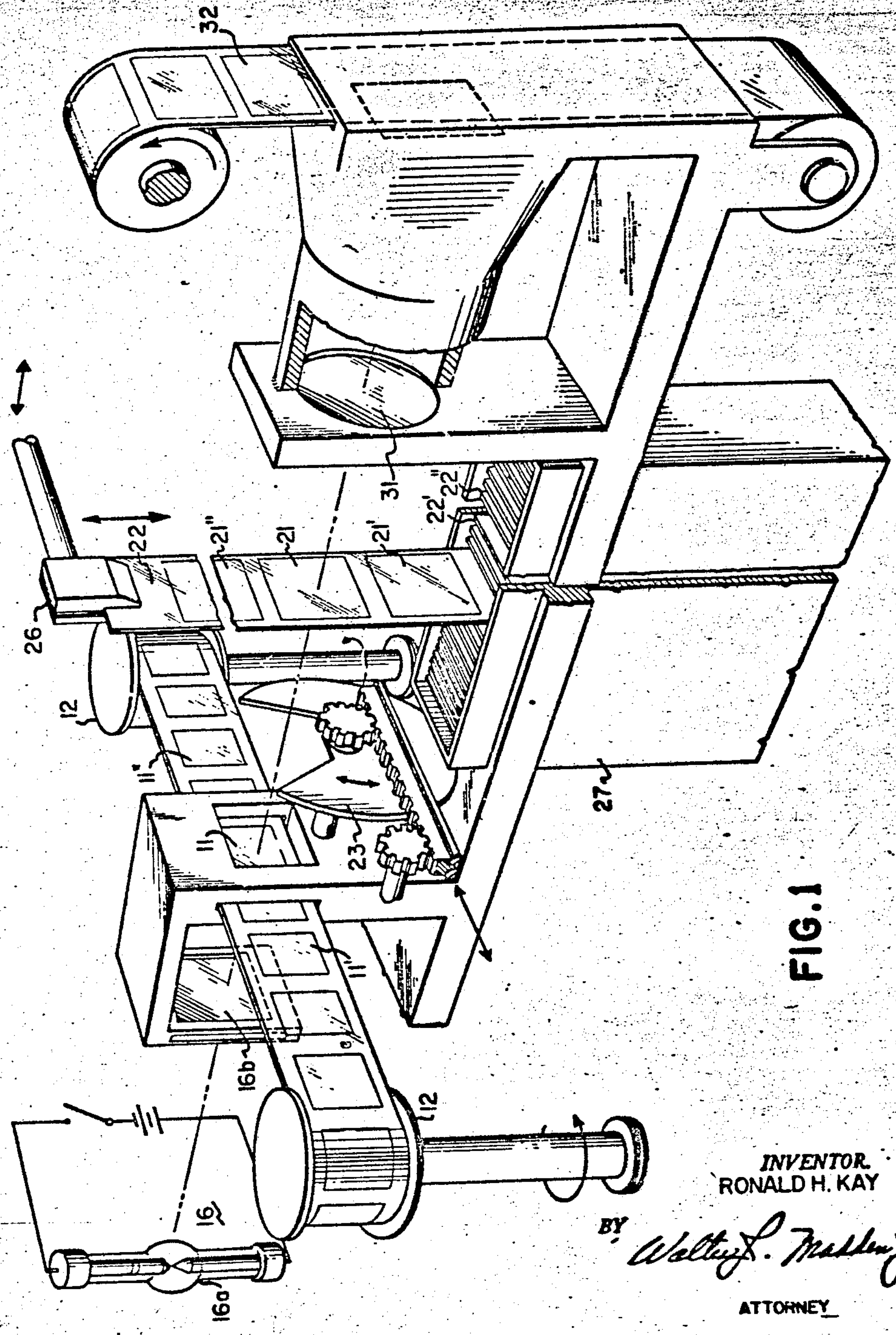

Fig. 1 illustrates in perspective form one suitable system for document storage by means of holograms in accordance with the theoretical considerations discussed above. Reference numeral 11 designates an object, an image of which is to be stored in the system of the present invention. Object 11 may be a transparency or microfilm, positive or negative, of a letter or printed page or drawing or any other document which is to be stored for subsequent retrieval. Object 11 will have opaque areas thereon corresponding generally to written or printed areas of the document and will have transparent areas thereon corresponding to the portions of the document on which there is no printing or drawing or other matetrial, or vice versa. Object 11 may be part of a strip containing a plurality of other objects 11', 11", etc. and may be positioned with respect to the optical axis by means of a mechanism such as the film drive designated by numeral 12.

Object 11 is illuminated by means of a point source 16 of monochromatic radiation such as the lamp 16*a* and monochromatic filter 16*b*. The diffraction pattern resulting from the illumination of object 11 by source 16 falls upon a strip 22 of a light sensitive medium on which the hologram is to be produced. Such medium may be of any suitable type which is sensitive to the light from source 16 to produce the designed hologram. Examples of suitable materials would include vesicular materials which are responsive to ultraviolet light followed by heat, or the Chalkley type of materials, or any other print-out or dry processed radiation sensitive material on a transparent base. A number of separate images 21, 21', 21", etc. may be recorded on each strip 22, and a plurality of strips 22, 22', etc. may be utilized to increase the capacity of the storage system.

In the embodiment illustrated in Fig. 1, each of strips 22, 22', etc. may be positioned to align the desired image locations 21, 21', 21", etc. on the selected strip 22 along the optical axis with the light source 16 and the object 11. Such positioning of strip 22 may be performed by any suitable means such as one including an arm 26 which is positionable to grip the top of a selected strip 22 and withdraw this strip a controllable distance from a storage bin 27. Storage bin 27 holds a plurality of the strips 22, with each of the strips fitting in a corresponding slot in the bin and being spaced from the other strips along the optical axis.

For production of a hologram of the object 11 and the storage of this hologram in the file system, the procedure is as follows. The object 11 to be stored is positioned by mechanism 12 in front of the monochromatic point light source 16 on the optical axis discussed above. Arm 26 positions the selected one of strips 22 so that the desired one of image locations 21 within this selected strip is positioned on the optical axis to receive the diffraction pattern resulting from the illumination of object 11 by source 16. A shutter 23 may control the exposure of image location 21 on strip 22. The diffraction pattern falling on the selectively positioned image location of strip 22 thus produces thereon a hologram of the object 11 which comprises the file image for storage. In the case of a print-out emulsion, no further processing of the light sensitive material is required. In the case of a heat developed material, such as vesicular materials, a source of infra-red radiation may be focused on the exposed film strip to effect heat development. Upon completion of production of the hologram, arm 26 lowers the withdrawn strip 22 back into its slot in bin 27 where the image may be stored until reproduction thereof is desired.

When it is desired to reproduce the image of object 11 from the selected location 21 on strip 22, arm 26 again withdraws the selected strip 22 from bin 27 and again positions the strip so that location 21 containing the image of object 11 is positioned along the optical axis. Under these circumstances, of course, object 11 will not be positioned in front of light source 16. If all the elements of the optical system of the embodiment of Fig. 1 are to be maintained stationary during both the production of the hologram and the reconstruction thereof, it is necessary to utilize a lens 31 in reconstructing the image from the stored hologram. The optical variables involved in the apparatus illustrated in Fig. 1 are shown diagrammatically in Fig. 4, where S represents the source 16, and the holograms corresponding to the different strips 22 in bin 27 are represented by the vertical lines labeled "holograms."

Figure 4:
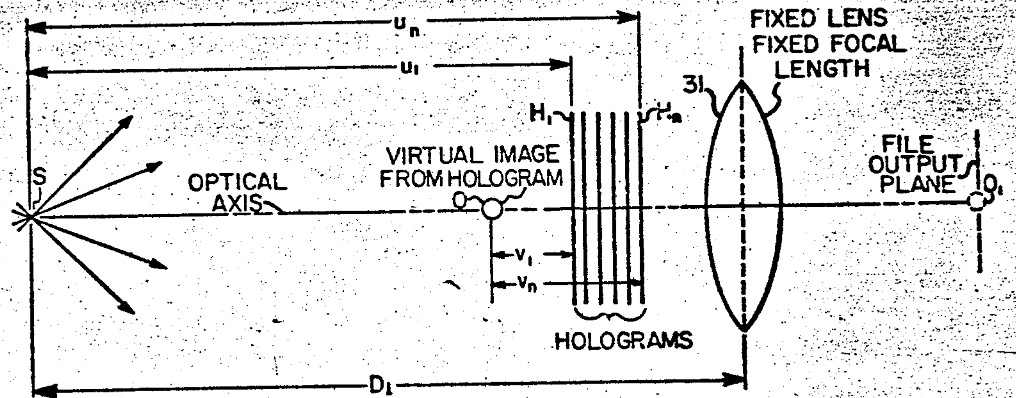
Fig. 4 is a diagram illustrating the optical factors involved in the embodiment of Fig. 1.

When a hologram on one of strips 22 is illuminated by source 16 as discussed above for reconstruction of the image, a virtual image of the hologram will be formed in plane O of Fig. 4. Lens 31 is positioned as shown in Fig. 4 to form an image of this virtual image of plane O in plane $O_1$, and it is in this plane $O_1$ that the output medium is disposed on which a facsimile of the stored information is to be produced. Such an output medium may be of any suitable photosensitive type which is responsive to the illumination from source 16 to produce a copy of the document stored as a hologram on strip 22. In the embodiment illustrated in Fig. 1, the output medium is shown as a strip 32 of light sensitive material which is disposed in the output plane $O_1$. Strip 32 may be advanced by means of the reel mechanism illustrated to receive the image from the hologram which is stored on the selected strip 22.

In the embodiment illustrated in Figs. 1 and 4, if the source 16 and the holograms are fixed in position, as they are assumed to be in this embodiment, the image reconstructed in plane O will have the same size as the original input object, so that the final magnification at the output station in plane $O_1$ will be the magnification produced by the auxiliary lens 31. If the distance between plane O and the auxiliary lens 31 is twice the focal length of this lens, the image in plane $O_1$ will again have unity magnification. The choice of optical configuration and wavelength as indicated in Equation 5 will further affect the size of the reproduced object which served as input to the file.

As a numerical example of the spacings which might be employed in apparatus similar to that shown in Fig. 1 and diagrammatically represented in Fig. 4, let the spacing for one hologram $H_1$ be:

$$u_1=20 \text{ cm.}$$
$$v_1=40 \text{ cm.}$$

and $$f=5 \text{ cm.}$$

For another object having a hologram $H_n$, let, $$u_n=52 \text{ cm.}$$
$$v_n=36 \text{ cm.}$$

and $$f=117 \text{ cm.}$$

In both cases $(u-v)=16$ cm.=a constant. The total storage space available is then 52−20=32 cm. Reconstruction of the images may be achieved with a positive lens having a focal length $F=22$ cm., with this lens placed a distance $D_L$, of 60 cm. from the source S, resulting in a magnification of unity for the final image at the output station in plane $O_1$.

It will be seen that the embodiment illustrated in Fig. 1 results in a system in which each of the strips 22 need be moved only in a vertical direction to position the desired one of image locations 21 on the optical axis with the monochromatic point light source 16 and the light sensitive medium on which the hologram is to be recorded. It is not necessary to move the different strips 22 horizontally along the optical axis to position each of them at the same optical station, since the hologram acts as a variable focus lens to produce an effective focusing of the images on the different horizontally spaced In the embodiment illustrated in Figs. 1 and 4, it was necessary to utilize a lens in the process of reconstructing the image stored in the hologram, since it was desired to utilize the virtually reconstructed image produced in plane O of Fig. 4. If it is desired to eliminate lenses completely in a system, it is necessary to utilize the real reconstructed image in plane O', as shown diagrammatically in Fig. 3. As discussed above, the requirement is that $(v+v')$ should be maintained constant and independent of variations in the distance S. It can be shown that this necessitates changing the distance $d$ according to the equation:

$$\frac{1}{v}-\frac{1}{d}=\frac{2}{k}=\text{constant} \tag{6}$$

In other words, during the making of the hologram or the reconstruction of the image recorded thereon, any change in the distance between the object and the hologram must be accompanied by a corresponding change in the distance between the object and the source in such a way that Equation 5 is satisfied. In this way, the object plane and the reconstructing plane will be fixed for all the different holograms which are stored in different planes.

Thus, to employ the present invention without utilizing lenses in either the formation of the hologram or the reconstruction thereof requires that the light source 16 be positioned at different points along the optical axis for different holograms so as to satisfy Equation 6 for all of the holograms. Such movement of the light source 16 may be performed by any suitable mechanism, such as a servo positioning system which positions light source 16 to any desired position along the optical axis. This positioning of the light source may be performed simultaneously with the vertical positioning of strip 22 by arm 26 so that the positioning of the light source does not add any appreciable time to the operation time of the system.

Figure 5:
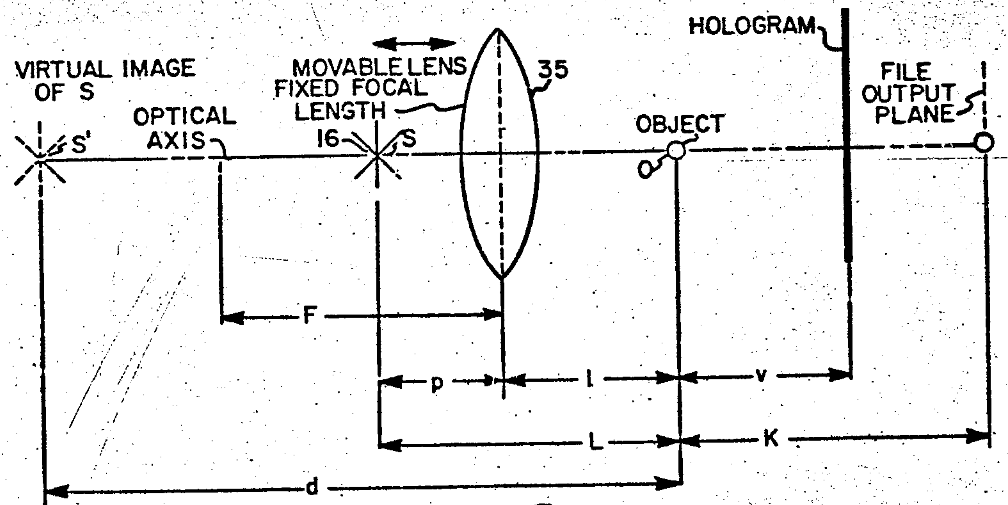
Fig. 5 is a diagrammatic illustration of an alternative embodiment of the present invention utilizing a lens between the monochromatic light source and the object.

To eliminate the need for moving light source 16, the change in the distance $d$ for the different holograms can be achieved by utilizing a lens of fixed focal length F which is moved to different positions. Such a system is shown diagrammatically in Fig. 5, where the elements illustrated in the embodiment of Fig. 1, such as the light source 16, the object 11, and the strip 22 on which a hologram is formed, are represented diagrammatically. This system includes a lens 35 of fixed focal length F which is movable along the optical axis in such a way that its distance $p$ from the source 16 is always less than its focal length F. A virtual image S' will then be formed whose distance from the object O is $d$. Changing the distances $p$ or 1 will result in changing d according to the equation:

$$\frac{kv}{k-2v}=\frac{p-lL+LF}{l+F-L} \tag{7}$$

In the embodiments illustrated and described thus far, it has been assumed that the distance $d$ between the source and the object is to be changed for different holograms. However, as an alternative to varying this distance for the different holograms, the distance may be maintained constant and the wavelength λ of the illumination may be changed. This technique may be utilized in one form by choosing a value λ during formation of the hologram and then changing the wavelength to a value λ' during the reconstruction of the image from the hologram. The variation of wavelength from λ to λ' must satisfy the equation:

$$\lambda'=\lambda\left[\frac{d}{v}\left(\frac{k-v}{k+d}\right)\right] \tag{8}$$

This change in wavelength may be used to particular advantage in the case of photosensitive materials which are light sensitive to a particular wavelength λ, while the exposed regions of the photosensitive materials have a maximum absorption at a wavelength λ'. Essentially this change in the wavelength λ of the illumination changes the effective focal length of the hologram in such a way that the reconstructed image O' will always be in the same plane. The required variation in the wavelength of the illumination may be accomplished by any suitable means, such as the interposition of different filters for filter 16*b*.

Figure 6:
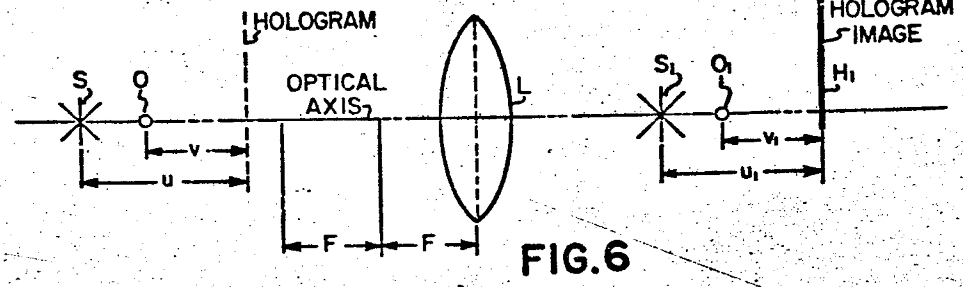
Fig. 6 diagrammatically illustrates a method of demagnifying the hologram prior to recording it.

In all of the above illustrated and described embodiments the image stored on the hologram is larger than the object itself, owing to the nature of the formation of holograms. While it is satisfactory in many situations to store images which are larger than the object, it may be desirable in some situations to form a hologram of reduced size. A method to reduce the size of the stored hologram involves the optical demagnification of the hologram prior to recording. In this approach, shown diagrammatically in Fig. 6, a lens L of short focal length F is positioned on the optical axis to produce images $S_1$, $O_1$ and $H_1$, respectively, of the source S, the object O, and the hologram H. If S, O and H are at distances greater than 2F from the lens, their images $S_1$, $C_1$, and $H_1$ will all be at distances in the image space which lie between F and 2F from the lens, thus resulting in demagnification of $S_1$, $O_1$, and $H_1$. The image $H_1$ is recorded, to produce the desired magnification.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

Apparatus for storing and retrieving images of partially transparent objects from a storage file, said storage file comprising a plurality of spaced compartments, a monochromatic light source which is substantially a point source, a plurality of strips of a first light sensitive medium disposed in the different said compartments in said storage file, means for selectively withdrawing any one of said first light sensitive strips from said storage file by movement in only one dimension to position said selected strip on an optical axis with said light source, each of the different said strips being positioned at a different fixed exposure point along said axis, means for disposing said partially transparent object on said optical axis between said light source and the light sensitive strip in the exposure position, means for transmitting light from said source along said axis to produce on each of said strips a hologram of said object, means for returning each said removed strip to its respective compartment in said storage file by movement only in said one dimension upon completion of the formation of said hologram, a second light sensitive medium, means for positioning said second medium on said optical axis at a fixed point along said axis, means for withdrawing any one of said exposed strips from said storage file by movement only in said one dimension to position said withdrawn strip on said optical axis between said light source and said second light sensitive medium, means for transmitting light from said source along said optical axis and for imaging the hologram on said withdrawn strip on said second light sensitive medium to produce a reproduction of the image of said object on said hologram, and means for returning said withdrawn strip to its compartment in said storage file by movement only in said one dimension upon completion of said reproduction.

References Cited in the file of this patent

UNITED STATES PATENTS 1,263,355 Artigue ............... Apr. 16, 1918

OTHER REFERENCES

Image Formation by Reconstructed Wave Fronts (March 15, 1956), Journal of The Optical Society of America, vol. 46, No. 10, October 1956, pages 825–831. Kirkpatrick et al.

UNITED STATES PATENT OFFICE

CERTIFICATE OF CORRECTION

Patent No. 2,982,176

May 2, 1961

Ronald H. Kay

It is hereby certified that error appears in the above numbered patent requiring correction and that the said Letters Patent should read as corrected below.

Column 2, line 14, for "advantagse" read -- advantages --; column 5, line 53, after "spaced" insert -- strips 22. --; column 6, lines 19, 25, and 28, for "F", each occurrence, read -- $\bar{F}$ --; line 30, for "1" read -- $\bar{1}$ --; same column 6, line 75, for "$C_1$" read -- $0_1$ --.

Signed and sealed this 26th day of September 1961.

(SEAL)
Attest:

ERNEST W. SWIDER
Attesting Officer

DAVID L. LADD
Commissioner of Patents

USCOMM-DC